(12) United States Patent
Kaufman

(10) Patent No.: US 6,178,508 B1
(45) Date of Patent: Jan. 23, 2001

(54) SYSTEM FOR CONTROLLING ACCESS TO ENCRYPTED DATA FILES BY A PLURALITY OF USERS

(75) Inventor: Charles W. Kaufman, Northborough, MA (US)

(73) Assignee: International Business Machines Corp., Armonk, NY (US)

(*) Notice: Under 35 U.S.C. 154(b), the term of this patent shall be extended for 0 days.

(21) Appl. No.: 09/031,150

(22) Filed: Feb. 26, 1998

Related U.S. Application Data

(62) Division of application No. 08/579,812, filed on Dec. 28, 1995, now Pat. No. 5,787,169.

(51) Int. Cl.⁷ .............................. H04L 9/32; G06F 7/04
(52) U.S. Cl. ............................................ 713/183; 713/202
(58) Field of Search .................................. 713/168, 183, 713/202, 262; 705/72

(56) References Cited

U.S. PATENT DOCUMENTS

| | | | |
|---|---|---|---|
| 5,052,040 | 9/1991 | Preston et al. | 380/4 |
| 5,210,795 | 5/1993 | Lipner et al. | 380/25 |
| 5,276,737 | 1/1994 | Micali | 380/30 |
| 5,315,658 | 5/1994 | Micali | 380/30 |
| 5,319,705 | 6/1994 | Halter et al. | 380/4 |
| 5,369,707 | 11/1994 | Folendore | 380/25 |
| 5,373,559 | 12/1994 | Kaufman et al. | 380/30 |
| 5,394,471 | 2/1995 | Ganesan et al. | 380/25 |
| 5,418,854 | 5/1995 | Kaufman et al. | 380/25 |
| 5,421,006 | 5/1995 | Jablow et al. | 380/4 |
| 5,497,421 | 3/1996 | Kaufman et al. | 380/25 |
| 5,517,569 | * 5/1996 | Clark | 380/52 |
| 5,519,778 | 5/1996 | Leighton et al. | 380/21 |
| 5,647,000 | 7/1997 | Leighton | 380/30 |
| 5,666,415 | 9/1997 | Kaufman | 380/25 |

OTHER PUBLICATIONS

Morris et al., "Password Security: A Case History," Communications of the ACM, vol. 22, No. 11, Nov. 1979, pp. 594–597.*

Schneier, "Applied Cryptography: Protocols, Algorithms, and Source Code in C," John Wiley & Sons, Oct. 1993, pp. 28–29.*

* cited by examiner

Primary Examiner—Tod R. Swann
Assistant Examiner—Justin T. Darrow
(74) Attorney, Agent, or Firm—Kudirka & Jobse, LLP

(57) ABSTRACT

A system in which an encrypted data file can be protected, accessed, and maintained by a plurality of users using cryptographically hashed passwords. The system provides for the creation in memory for each authorized user of a cryptographically hashed password as an entry in an unencrypted header file. The system compares an authorized user's cryptographically hashed password against a corresponding set of cryptographically hashed passwords in memory to determine whether the user is allowed access to the protected data file. The passwords are cryptographically one-way hashed with a "salt" value in such a way as to make reconstruction of original passwords by an unintended party virtually impossible, because the passwords never exist in memory in an unhashed state. Furthermore, the passwords are cryptographically "one-way" hashed so as not to be reconstructible. Upon successful authorization of a user, based on successful comparison of the user's hashed password with those in memory, the user gains access to the encrypted data file.

16 Claims, 5 Drawing Sheets

SYSTEM FOR CONTROLLING ACCESS TO ENCRYPTED DATA FILES BY A PLURALITY OF USERS

This application is a divisional application of U.S. PTO Pat. application No. 08/579,812, filed Dec. 28, 1995 now U.S. Pat. No. 5,787,169 which is incorporated herein by reference.

FIELD OF THE INVENTION

This invention relates to computer security and, in particular, to systems in which encrypted information can be protected and maintained by multiple users using passwords.

BACKGROUND OF THE INVENTION

Many computer systems utilize some type of security to prevent unauthorized use. In the vast majority of systems this security takes the form of a single password per user for a particular company. The password is conventionally an arbitrary combination of characters known only to the user. The combination of characters is generally encoded in the system as a combination of bits and may be used to control login to the system as well as access to secure information in selected files.

In some systems, additional security is provided by requiring two or more users to act in concert in order to access secure information in files. In such systems, a group of users must all enter correct passwords in a single session in order to access the information. This type of operation is similar to the well-known protocols for the launching of nuclear weapons or financial documents which require two signatures (perhaps an employee and the employee's manager) to be valid.

A problem with such multiple user systems is that, if concerted action is needed for access to some information, there is a danger that one of the users required for concerted access to the file will forget his password or leave the company without telling anyone the password and thereby prevent the other remaining users from accessing the secured information. In many systems, it is possible to override the security system and obtain access to the information even if all users needed to access the information are not available. However, in cryptographic systems where the information is secured by encrypting it, it may not be possible to decrypt the information without all of the passwords. In addition, resources which require several users acting in concert are often cumbersome to use simply because it is often difficult to get all of the required users together in order to access the file.

One mechanism for avoiding these problems is to allow access to the secured information by a subset, or quorum, of the total group of users. For example, if there are five users, any two of the five users can concurrently enter passwords to access the secured data. Therefore, if one user forgets his password, leaves the company or is simply not available, a quorum can still be formed of the remaining users in order to access the data. This method works well with cryptographic systems because no special precautions need to be taken for lost or forgotten passwords.

In such a system, when a user name is entered, a password prompt would appear but two or more passwords would be required. Once the passwords were entered, one or more users could leave and let the remaining users work, or if the security constraints mandated, all users might be (administratively) required to remain present until the work was done and the passwords "cleared". In either case, a user who left the company in possession of a valid password would find the password useless unless he could get the cooperation of other authorized users.

One problem with such quorum systems is that entry of the passwords can be cumbersome. Generally each user must enter his name and password. The passwords are then combined and the combination is checked against authorized combinations stored in an access file. However, if several users must enter passwords and the last person makes a mistake entering his password, then often all users must reenter their passwords.

Quorum systems also have problems with maintainability. For example, in order to change the size or composition of the possible groups, some method must be provided to obtain combinations of the passwords to form the quorum password combinations. Typically, all authorized users must reenter their passwords if a change is made to the size and composition of the quorum groups or if users are added or deleted.

Accordingly, there is a need for a security system which is useful for cryptographic systems, but can easily be maintained and can recover if passwords are forgotten. There is also a need for a security system in which the entry of passwords is simplified.

SUMMARY OF THE INVENTION

A secure system is achieved in accordance with the principles of the present invention by utilizing an unencrypted header file which is used to store a username and cryptographically hashed password for each of a plurality of authorized users. The passwords in the header file are cryptographically one-way hashed with a "salt value", so as to not be reproducible by an unauthorized party. The salt value is a number which is typically unknown and can be the product of, for example, a random number generator. One-way hashing means that the actual password can not be recreated by an unintended party, even if the salt value were known. The cryptographically hashed passwords are never kept in an unprotected, or unhashed, state in memory, so are not vulnerable to access by an unintended party.

During use of the system, an authorized user must enter a password which, when hashed, can be found in the unencrypted header file. If the entered password is found in the file, the user is authorized access to the protected encrypted data.

Anyone gaining access to the unencrypted header file cannot obtain the passwords themselves. And, access to the encrypted data can not be gained without an authorized password.

DETAILED DESCRIPTION OF THE PREFERRED EMBODIMENT

Figure 1:
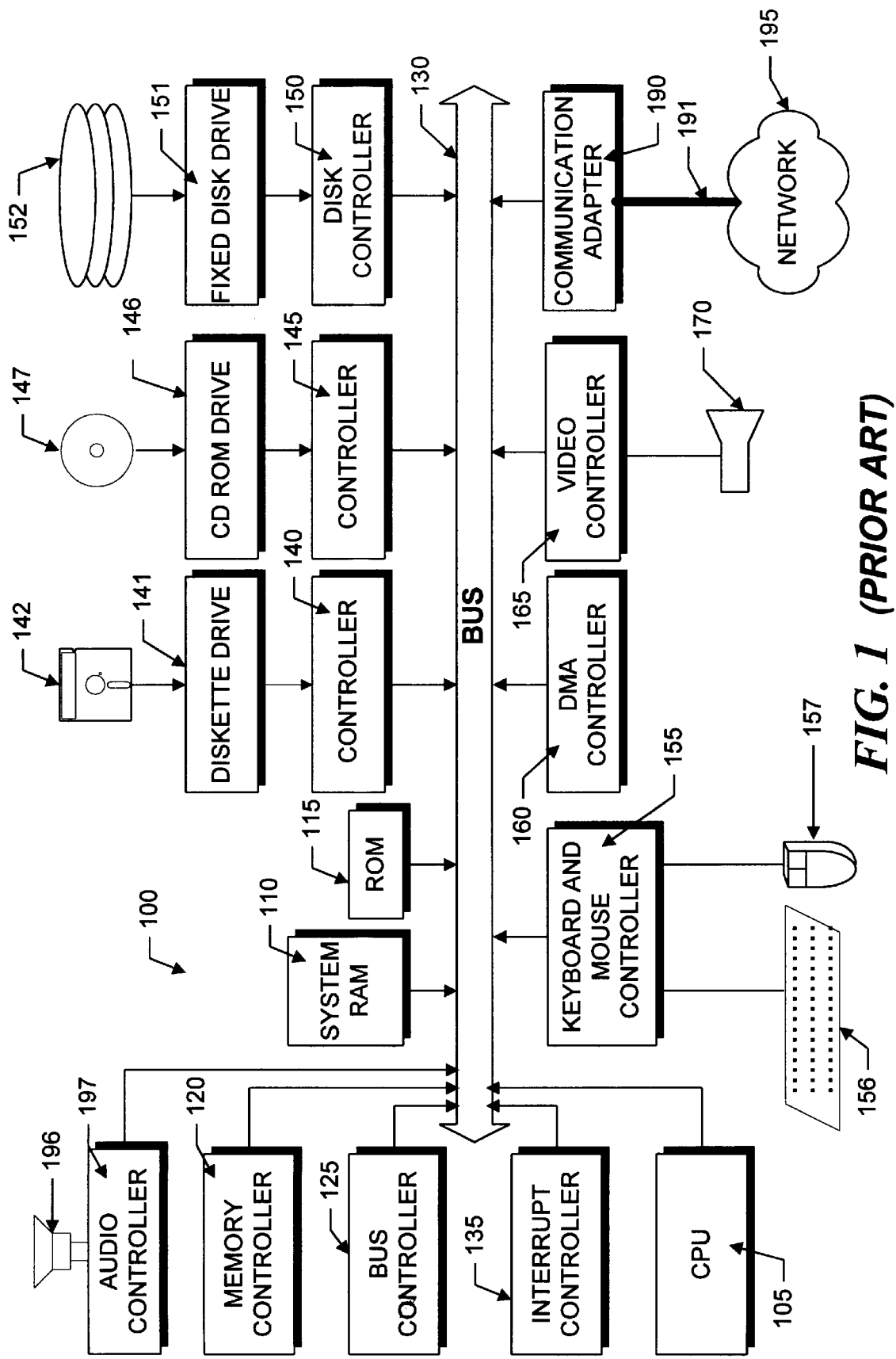
FIG. 1 is a block diagram of a personal computer system suitable for use with the present invention.

FIG. 1 illustrates the system architecture for a conventional computer system, such as an IBM PS/2® computer on which the inventive security system can operate. The exemplary computer system of FIG. 1 is for descriptive purposes only. Though the description below may refer to terms commonly used in describing particular computer systems, such as an IBM PS/2 computer, the description and concepts equally apply to other systems, including systems having architectures dissimilar to FIG. 1.

The exemplary computer 100 includes a central processing unit ("CPU") 105, which may include a conventional microprocessor; a system random access memory ("RAM") 110 for temporary storage of information and a read only memory ("ROM") 115 for permanent storage of information. A memory controller 120 is provided for controlling system RAM 110; a bus controller 125 is provided for controlling bus 130; and an interrupt controller 135 is used for receiving and processing various interrupt signals.

Mass storage may be provided by a diskette 142, a CD-ROM disk 147 or a hard disk 152. The diskette 142 can be inserted into a diskette drive 141, which is, in turn, connected to bus 130 by a controller 140. Similarly, the CD-ROM disk 147 can be inserted into a CD-ROM drive 146, which is also connected by a controller 145 to bus 130. Finally, hard disks 152 are part of a fixed disk drive 151, which is connected to bus 130 by controller 150.

Input and output to computer system 100 are provided by a number of devices. For example, a keyboard and mouse controller 155 connects to bus 130 for controlling a keyboard input device 156 and a mouse input device 157. A DMA controller 160 is provided for performing direct memory access to system RAM 110. A visual display is generated by a video controller 165, which controls a video output display 170. The computer also includes a communications adapter 190 which allows the system to be interconnected to a local area network (LAN) or a wide area network (WAN) which is schematically illustrated by bus 191.

The computer 100 is generally controlled and coordinated by operating system software, such as the OS/2® operating system, available from the International Business Machines Corporation ("IBM"), Boca Raton, Fla. Conventional operating systems control and schedule computer processes for execution, perform memory management, provide file system, networking, and I/O services, and provide a user interface, such as a graphical user interface ("GUI"), among other things. User applications, such as editors and spread sheets, directly or indirectly, rely on these and other capabilities of the operating system.

Figure 2:
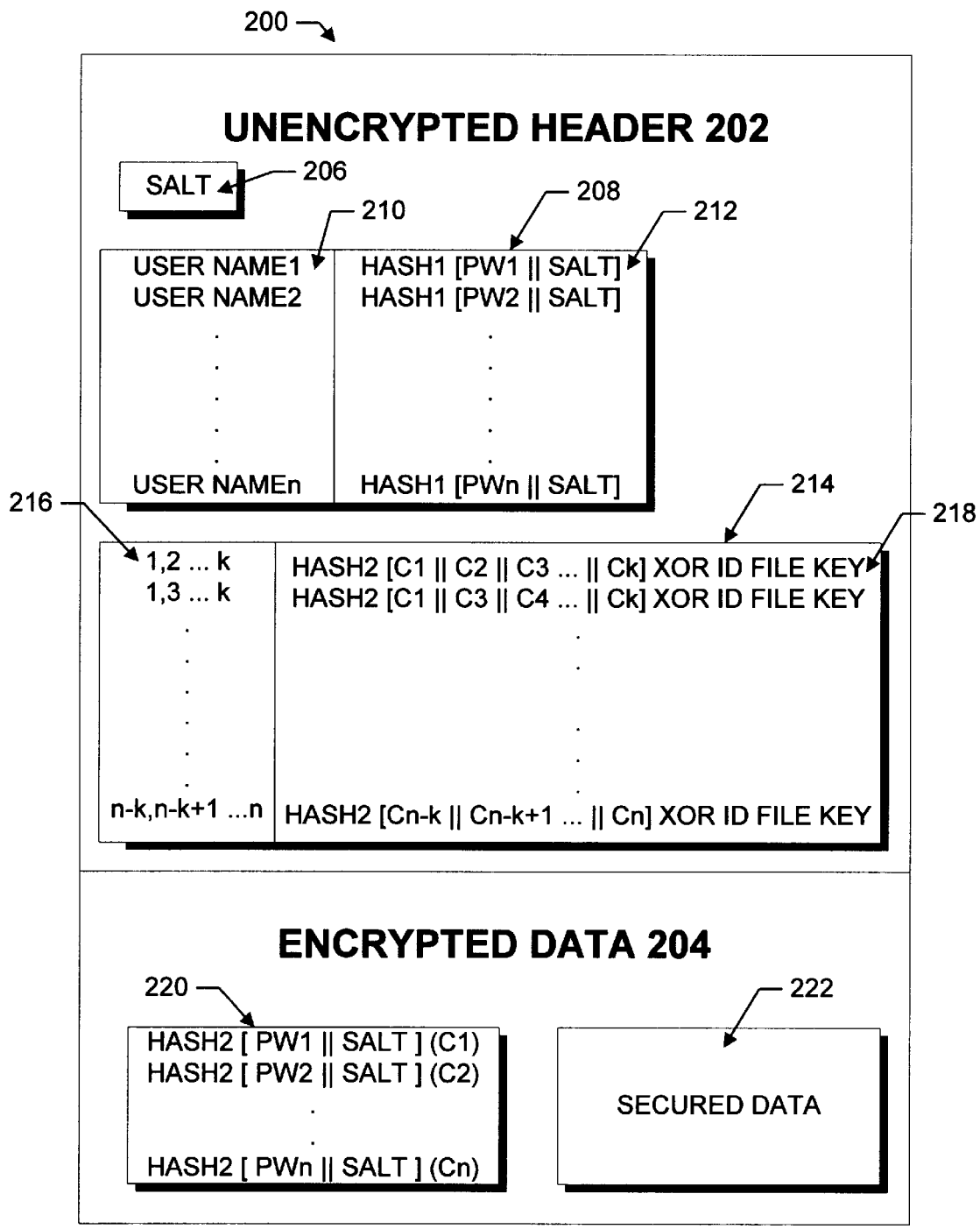
FIG. 2 is a schematic diagram illustrating the some of the contents of a data file secured in accordance with the principles of the invention.

FIG. 2 illustrates the structure of a data file 200 constructed in accordance with the principles of the present invention. The file consists of two main sections, although other sections may exist. These other sections are not necessary for an understanding of the invention and are omitted from the figure for clarity. In particular, the file consists of an unencrypted or "cleartext" header 202 and an encrypted data part 204. Although the unencrypted portion and the data portion are shown as two parts of a single file, separate unencrypted and encrypted files could be used without departing from the spirit and scope of the invention. Similarly, although table 220 and data portion 222 are shown as part of the encrypted portion 204, they could also be placed in separate files.

The cleartext data in the encrypted data portion 204 of the file 200 is encrypted using a single file key in a well-known manner. There are several conventional, single key encrypting techniques which could be used to encrypt the file including, but not limited to the DES encoding scheme, the RC2 encoding scheme, the RC4 encoding scheme or the IDEA technique. This same encoding technique can also be used to encrypt the secured data portion 222 either as part of the data portion 204 of file 200 or as a separate file.

The single file key used to encrypt the data portion of file 200 is then itself encrypted using the inventive multi-password scheme described in detail below.

The clear text header 202 includes several tables and a randomly-chosen value 206 referred to herein as "salt" stored therein. The salt value 206 is typically provided as a randomly-selected value which may be selected using a random number generator of a computer, for example. The actual value is not critical, but the salt number should have a sufficient number of bits that the selection of duplicate salt numbers for different files is extremely unlikely. Illustratively, a salt value 206 having 64 bits can be used.

Also included in unencrypted header 202 is a first table 208 which consists of a plurality of entries with two fields for every entry. In particular, each entry has a first field 210 containing a user name and a second field 212 containing a cryptographic hash of the password corresponding to the user name in field 210.

In an illustrative embodiment, a password corresponding to a user name is hashed using a one-way cryptographic "hash" of the actual password combined with the salt value. In particular, the password can be simply concatenated with the salt value or combined in another manner and then hashed.

Figure 3:
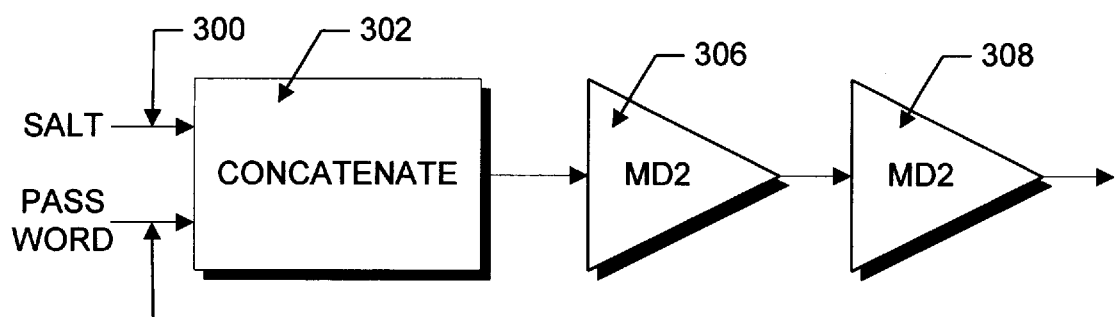
FIG. 3 is a schematic diagram illustrating apparatus for performing a cryptographic hash of input values.

An illustrative apparatus for generating a cryptographic "hash" of input values is illustrated in FIG. 3, but other, similar arrangements well-known to those in the art can also be used without departing from the scope of the invention. In particular, as shown in FIG. 3, the salt value on input 300 and the password on input 304 are provided to a concatenator 302. Concatenator 302 simply concatenates the bits forming the salt value with the bits comprising the password and provides the resulting series of bits to a one-way function 306.

A one-way function 306 is a well-known function which accepts a series of bits and performs a series of mathematical operations on the bits such that it is substantially impossible, given only the output of the one-way function, to reconstruct the input. There are several such functions well-known to those skilled in the art. One such function, suitable for use with the illustrative embodiment, is a one-way function called "MD2" which is described in detail in a book entitled *Network Security*, C. Kaufman, R. Perlman and M. Speciner, Prentice Hall 1995. A cryptographic hash is distinct from a key encryption scheme in that the encrypted data can be decrypted with the key. However, hashed data cannot be "unhashed."

The hashed value generated at the output of function 306 is fed to a second MD2 hash function 308 which implements a second MD2 hash function and provides a second hashed value at an output port thereof. It is this second hashed value which is stored in the second field 212 of table 208.

The hashing function represented by the two MD2 functions 306 and 308 (FIG. 3) is denoted in FIG. 2 by HASH1[. . . ]. The concatenation of two values is indicated by separating the values by two vertical lines ("||"). The mechanism shown in FIG. 3 could be preferably implemented by a software routine but could also be implemented in hardware. In any case, the routine is part of the permanent file security program.

It should be noted that the order of the entries in table 208 establishes an implied order for the passwords. For example, the first entry corresponds to password 1, the second entry to password two, etc. This order is important because it determines the ordering of the entries in the other tables as will hereinafter be explained.

Unencrypted header 202 also includes a second table 214 which also includes a plurality of entries, each of which has two fields 216 and 218. There is an entry for each combination of passwords which can be used to form the quorum necessary for decrypting the encrypted portion of the file.

For example, assume that there are five authorized administrators and two are required for a quorum. Further assume that the five passwords are PW1, PW2, PW3, PW4, and PW5 (the password numbers here refer to the entry orders in table 208 and not the actual order in which the passwords are entered by the users.) Then, since the order of entry does not matter and a password cannot be paired with itself, there are ten possible combinations of two passwords, each of which defines a value combination for a quorum:
(1) PW1, PW2
(2) PW1, PW3
(3) PW1, PW4
(4) PW1, PW5
(5) PW2, PW3
(6) PW2, PW4
(7) PW2, PW5
(8) PW3, PW4
(9) PW3, PW5
(10) PW4, PW5

Each of these ten combination would have an entry in table 214. The first field 216 of each entry is a set of numbers indicating which passwords are in the combination. This field consists of the entry numbers for the entries in table 208. Thus, for example, if a particular quorum consisted of users with USER NAME1 and USER NAME2 (and corresponding passwords PW1 and PW2, then the entry in the first field of table 214 would be 1, 2.

The second field 218 of table 214 consists of the file key encrypted using hashed passwords in the combination. In particular, a cryptographic hash for each password in the combination for the entry is generated by concatenating it with the salt value and hashing the concatenation. It is important that the hashing technique used in the second operation is different than the hashing technique used in forming table 208 for reasons that will be explained hereinafter.

Figure 4:
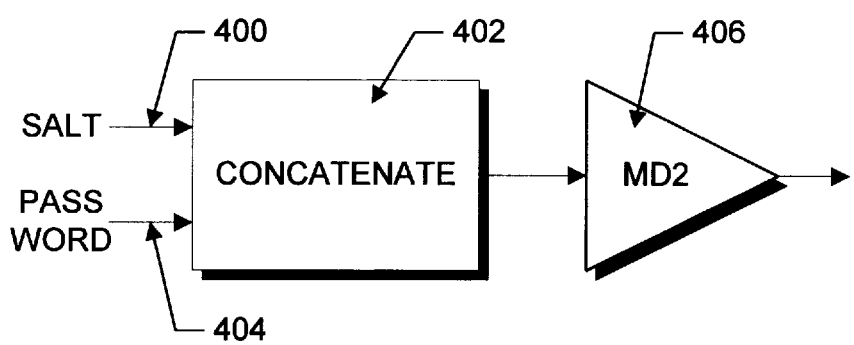
FIG. 4 is a schematic diagram illustrating apparatus for performing a cryptographic hash of input values different from that hashing mechanism shown in FIG. 3.

An apparatus for performing the second cryptographic hash is illustrated in FIG. 4, although other well-known techniques could also be used. As shown in FIG. 4, the procedure involves applying the salt value on input 400 and a password on input 404 to a concatenation function 406 which concatenates the bits from the two values. The output of the concatenator 402 is provided to a one-way function 406. As with the previous hashing function, the MD2 hashing function can be used as the one-way function. Here the MD2 function is only applied once to make the hashing function different from that used to construct table 208. Alternatively, the hashed output could be made different by concatenating the salt/password concatenation with another predetermined constant before passing it through the one-way function or by simply using a one-way function different than MD2.

As with table 208, this second hashing function is represented in table 214 by HASH2[. . . ] and concatenation is represented by vertical lines ("||"). Each hashed concatenation of a password and salt is also represented by a combination number (C1 . . . Cn). Therefore C1=HASH2[PW1||SALT];C2=HASH2[PW2||SALT], etc.

A password key is then formed of the combination values by concatenating the combination values and hashing the concatenated values with the second hashing function. For example, if an entry comprises passwords PW1 and PW2 the cryptographic key would be generated by forming HASH2[HASH2[PW1||SALT]||HASH2[PW2||SALT]] or HASH2[C1||C2]. The entries are concatenated in an order based on their ordering in table 208, not on the actual entry order. In addition, although the illustrative embodiment uses the hash function HASH2 to has the password combinations another hashing function could also be used.

This password key is then used to encrypt the file key. Ideally, the encryption process used to encrypt the file key is such that the file key can be easily recovered. In accordance with a preferred embodiment, the password key is simply exclusive-ORed with the file key. The result of the exclusive-OR operation is then stored in the second field 218 of the table 214. When this exclusive-OR function is used the file key can be easily recovered later by generating the password key from combination of entered passwords and exclusive-ORing the generated key with the value stored in the field 218 of the table 214.

In order to maintain the password files, it is possible to put the passwords into the encrypted data portion 204 of the file 200. However, if this were done, a user may legitimately obtain access to the passwords, but use them improperly in accessing other files, if, as previously mentioned, users use the same passwords in several contexts. Consequently, the encrypted data portion 204 of file 200 includes a series of hashed values 220 which are used to maintain the table 214 as will hereinafter be described. In particular, the entries in table 220 are the combination values C1 . . . Cn described above. Thus, the passwords themselves do not appear in the file.

Figure 5:
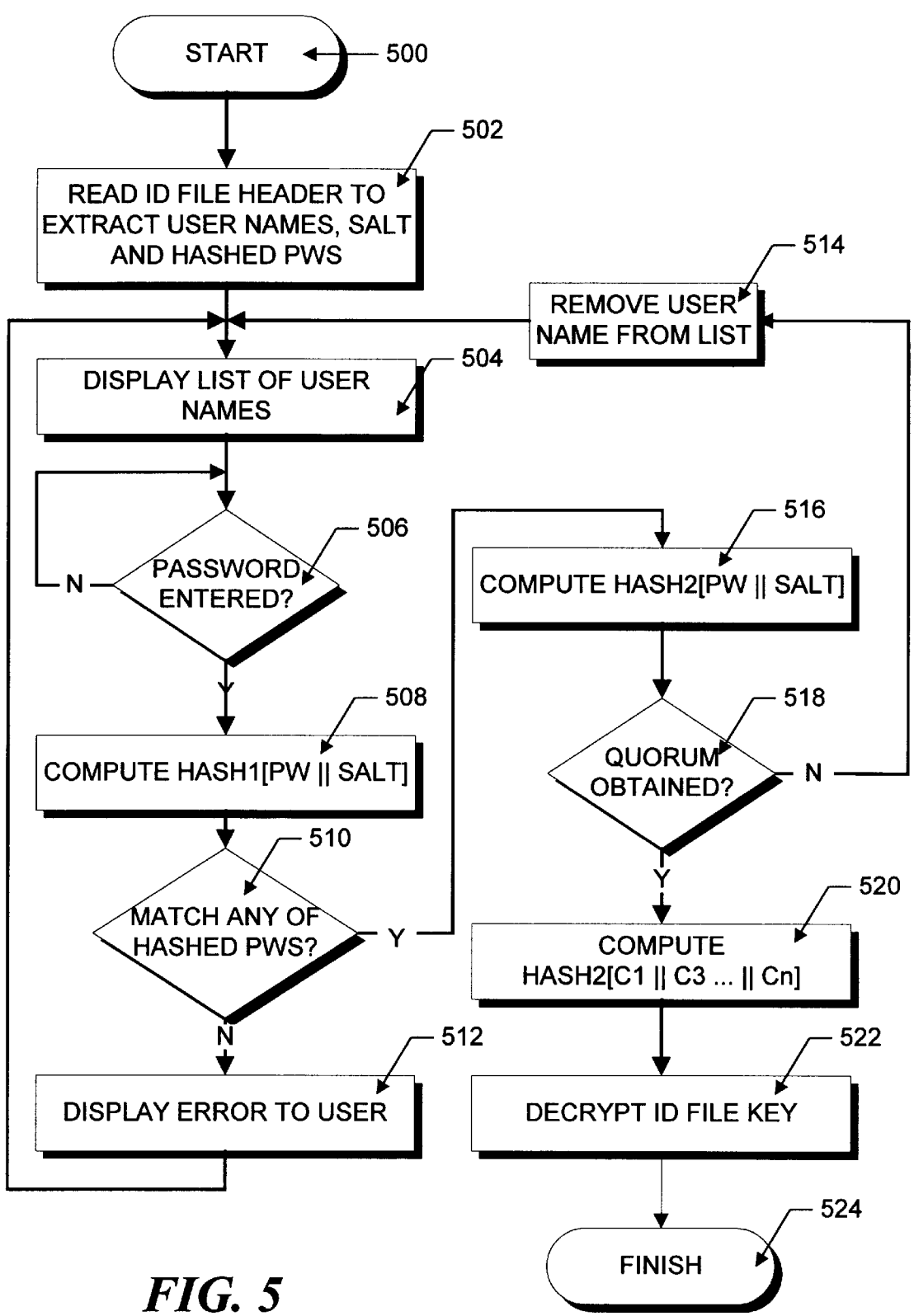
FIG. 5 is a flowchart illustrating an illustrative method for obtaining the file key used to encrypt the data file illustrated in FIG. 2 by the action of a quorum of users.

FIG. 5 is a illustrative flowchart illustrating a method for obtaining the file key of an encrypted file which contains the tables illustrated in FIG. 2 by a quorum of users. The rectangular elements (typified by element 500), herein denoted "processing blocks," represent computer software instructions or groups of instructions. The diamond-shaped elements (typified by element 506), herein denoted "decision blocks," represent computer software instructions or groups of instructions which effect the execution of the computer software instructions represented by the processing blocks. The flow diagram does not depict syntax of any particular computer programming language. Rather, the flow diagram illustrates the functional information which one of ordinary skill in the art would require to generate computer software to perform the processing required to decrypt an encrypted file structure. It should be noted that many routine program elements, such as initialization of loops and variables and the use of temporary variables, are not shown.

Turning now to FIG. 5, the program flow starts at 500 and proceeds to processing block 502 where the file header (or header file) is read to extract a list of authorized user names, the "salt" value and hashed passwords. The salt value, the user names and hashed passwords are typically extracted from tables such as tables 208 and 214 in the cleartext file header 202 (FIG. 2) and temporarily stored in memory. Next, in processing step 504, a list of the extracted user names is displayed, generally on a visual display screen. Decision block 506 implements a wait loop which waits for a password to be entered. In particular, the routine checks an input/output device such as a keyboard buffer to detect when a password has been entered. Alternatively, information may be entered by another equivalent method such as a magnetic stripe reader or other entry device. Although the following description describes entry by a keyboard, it is obvious that similar equivalent methods could be used. If no password has been entered, then the routine repeats step 506.

When a user enters a password, the routine proceeds to processing step 508. In step 508, the entered password is concatenated with the retrieved salt value and hashed with the first hashing function to generate HASH1[PW ‖SALT], as shown in step 508.

Decision block 510 checks to see if the hashed password just computed matches any of the hashed passwords retrieved from the file header 202 in step 502. If a match is not found, then the password has been entered incorrectly and the routine proceeds to step 512 where an error message is displayed to the user that entered the password. The routine then returns to step 504 to redisplay the user names in case an incorrect password was inadvertently entered. Not shown are conventional steps that would be taken if incorrect passwords are repeatedly entered.

If, in step 510, the hashed password matches one of the hashed passwords retrieved from table 208 in the header 202 of the file, then processing proceeds to step 516 where a second hashed value of the password concatenated with the salt value is computed using the second hashing function (HASH2[PW‖SALT]).

Next, in processing step 518, a check is made to determine whether a quorum of authorized users has been obtained. This step is performed by comparing the password numbers (based on the table order in table 208) already received with the valid combinations of passwords stored in the first field (216) of table 214.

If the set of password numbers already entered so far does not match one of the valid combinations for a quorum, then the computed hashed values and the password number are stored and processing continues to step 514 where the user name corresponding to the entered password is deleted from the displayed list.

The routine then proceeds back to step 504 where the adjusted list of user names is redisplayed. Processing continues by repeating steps 504, 506, 508, 510, 516, 518 and 514 until a quorum is obtained as indicated by the numbers of entered passwords matching one of the password number combinations stored in the first entry of table 214.

If, in step 520, it is determined that a quorum exists, then the stored hashed password values are concatenated in the order determined by table 208 and hashed using the second hash function to generate the password key as indicated in step 520. Since the concatenation is done by the ordering in table 208, rather than the actual entry order, the passwords to form a quorum can be entered in any order. Finally in step 522, the password key is used to decrypt the file key. In the illustrative example, step 522 is performed by exclusive-ORing the password key computed in step 520 with the value in the second field 218 in table 214 for the entry whose list (in the first field) matched the list of entered passwords. The routine then finishes in step 524.

Figure 6:
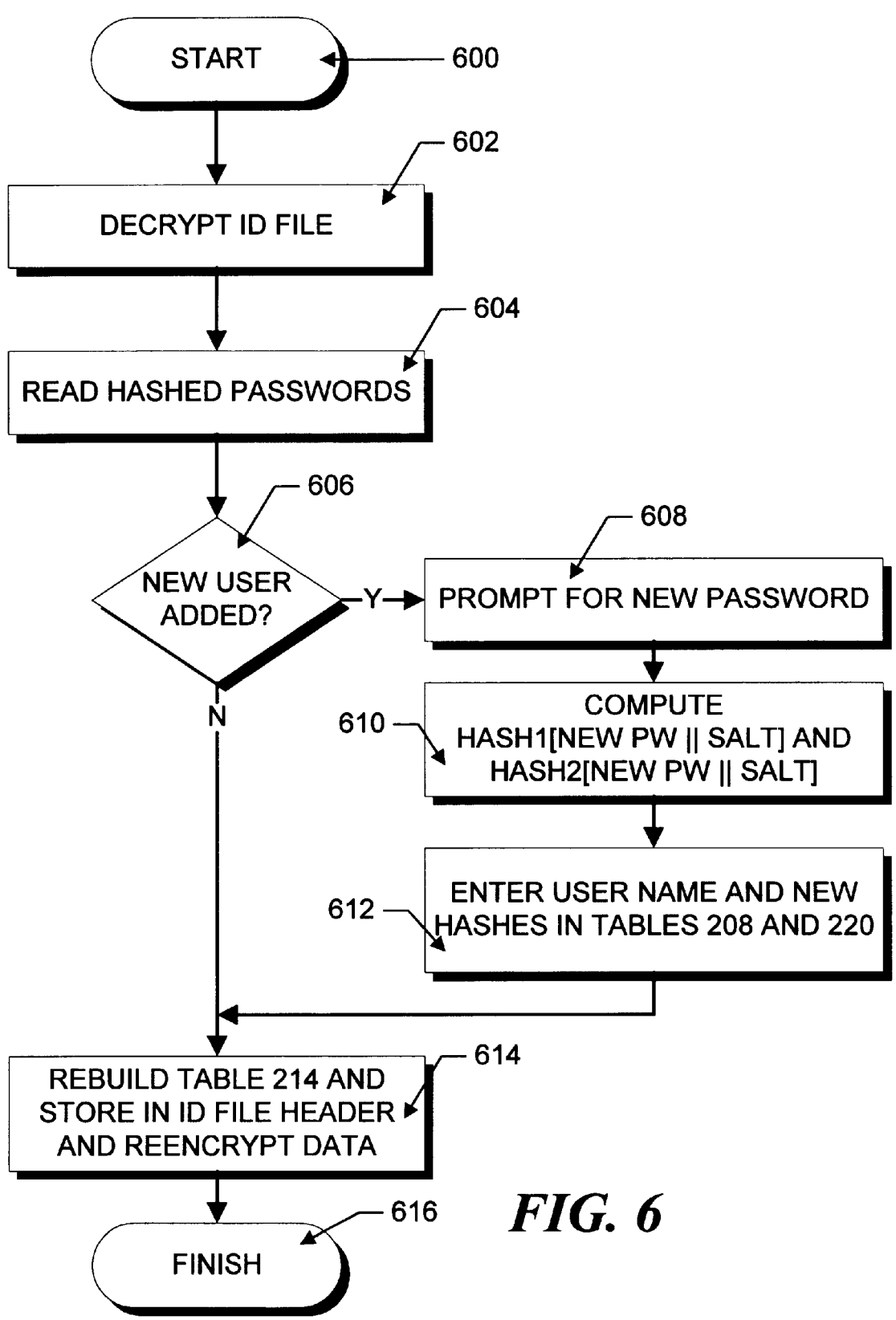
FIG. 6 is a flowchart representing an illustrative method for maintaining the data file of FIG. 2.

Referring now to FIG. 6, an illustrative routine to add or remove users or change quorum members is disclosed. The routine starts in step 600 and proceeds to step 602 in which the encrypted portion of the file is decrypted using the file key obtained using the procedure described above in conjunction with FIG. 5. After the encrypted portion of the file is decrypted, the hashed passwords in table 220 (FIG. 2) are read into memory. These hashed passwords will be used to rebuild the table 214.

Processing then continues to step 606 where a decision is made whether a new user will be added to the group of authorized users. If a new user is to be added, then an additional entry must be made in tables 208 and 220 for that user. In this case, processing continues to step 608 where the user is instructed to enter a new password. The newly entered password is concatenated with the salt value and then hashed using the first and the second hash function as indicated in step 610.

The new hashed values are then entered into the appropriate tables 208 (field 212) and table 220 as illustrated in step 612. In addition, the new hashed passwords are stored in memory for later rebuilding of the password combination file 214. In the case where more than one new user was being added to the group of authorized users, steps 608 and 610 would be repeated for each new user and all of the new user information would be entered into the appropriate tables in step 612.

The routine then proceeds to step 614. If, in decision box 606, a decision is made that no new users are being entered, the routine also proceeds to step 614. In step 614, using any new users and any new quorum rules the table 214 can be rebuilt. Since the table 220 is changed by the addition or deletion of users, the data portion of the file is re-encrypted using the same key or a new key, also as indicated in step 614. It should be noted that the hashed passwords read from table 220 in step 604 and the new hashed passwords are sufficient to rebuild the table 214 without knowledge of any of the actual passwords.

The inventive arrangement provides the following features. Since table 208 contains a list of user names and the associated hashed passwords, there is no necessity for users to enter first a user name and then a password. Any users whose name appears on the list can enter a password, without a corresponding name and in any order and the routine will recognize valid passwords. Further, the routine will recognize a valid combination of passwords regardless of the order in which the passwords are entered.

Further, it should be noted that actual passwords do not appear in either the cleartext header of the file or in the encrypted portion of the file. Since only passwords passed through a one-way function are found in the file, it is practically impossible to recover the passwords from the file alone. Thus, even if users do, in fact, use the same password in different files, with the inventive arrangement, the files will not be compromised. While it is possible to rebuild the file key decryption table 214 from the information in the encrypted portion of the file the table 214 cannot be rebuilt from the second field of table 208 because the hashing functions in the two tables are different.

Although only one embodiment of the invention has been disclosed, it will be apparent to those skilled in the art that various changes and modifications can be made which will achieve some of the advantages of the invention without departing from the spirit and scope of the invention. For example, various well-known encryption techniques can be substituted for those disclosed above to achieve the same results. These and other obvious modifications are intended to be covered by the appended claims.

What is claimed is:

1. Apparatus for controlling access to secured data stored in a memory by a plurality of authorized users, each of whom has a password, the apparatus comprising:

means for creating in the memory for each authorized user an entry having a cryptographically hashed password including the password of the each user cryptographically hashed with a hashing function;

means for receiving a password from one user;

means for cryptographically hashing the received password with the hashing function to produce a request value; and means responsive to the request value for permitting the one user to access the secured data when the request value matches any of the cryptographically hashed passwords in the memory.

2. Apparatus according to claim 1 wherein the means for creating the entries in the memory comprises means for combining each password with a predetermined salt value and means for cryptographically hashing the combination of the salt value and the password with the hashing function.

3. Apparatus according to claim 2 wherein the means for hashing the combination of the salt value and the password comprises means for concatenating the salt value and the password.

4. Apparatus according to claim 2 wherein the means for cryptographically hashing the combination of the salt value and the password comprises means for passing the combination through a one-way function.

5. A method for controlling access to secured data stored in a memory by a plurality of authorized users, each of whom has a password, the method comprising:

(a) creating in the memory for each authorized user an entry having a cryptographically hashed password including the password of the each user cryptographically hashed with a hashing function;

(b) receiving a password from one user;

(c) cryptographically hashing the received password with the hashing function to produce a request value; and (d) permitting, in response to the request value, the one user to access the secured data when the request value matches any of the cryptographically hashed passwords in the memory.

6. A method according to claim 5 wherein step (a) comprises:

(a1) combining each password with a predetermined salt value; and (a2) cryptographically hashing the combination of the salt value and the password with the hashing function.

7. A method according to claim 6 wherein step (a1) comprises concatenating the salt value and the password.

8. A method according to claim 6 wherein step (a2) comprises passing the combination through a one-way function.

9. A computer program product for controlling access to secured data stored in a memory by a plurality of authorized users, each of whom has a password, the computer program product comprising a computer usable medium having computer readable program code thereon, including:

program code for creating in the memory for each authorized user an entry having a cryptographically hashed password including the password of the each user cryptographically hashed with a hashing function;

program code for receiving a password from one user;

program code for cryptographically hashing the received password with the hashing function to produce a request value; and program code for permitting, in response to the request value, the one user to access the secured data when the request value matches any of the cryptographically hashed passwords in the memory.

10. A computer program product according to claim 9 wherein the program code for creating an entry in the memory for each authorized user comprises:

program code for combining each password with a predetermined salt value; and program code for cryptographically hashing the combination of the salt value and the password with the hashing function.

11. A computer program product according to claim 10 wherein the combining program code comprises program code for concatenating the salt value and the password.

12. A computer program product according to claim 10 wherein the program code for cryptographically hashing the combination comprises program code for passing the combination through a one-way function.

13. A computer data signal embodied in a carrier wave for controlling access to secured data stored in a memory by a plurality of authorized users, each of whom has a password, the computer data signal comprising:

program code for creating in the memory for each authorized user an entry having a cryptographically hashed password including the password of the each user cryptographically hashed with a hashing function;

program code for receiving a password from one user;

program code for cryptographically hashing the received password with the hashing function to produce a request value; and program code for permitting, in response to the request value, the one user to access the secured data when the request value matches any of the cryptographically hashed passwords in the memory.

14. A computer data signal according to claim 13 wherein the program code for creating an entry in the memory for each authorized user comprises:

program code for combining each password with a predetermined salt value; and program code for cryptographically hashing the combination of the salt value and the password with the hashing function.

15. A computer data signal according to claim 14 wherein the combining program code comprises program code for concatenating the salt value and the password.

16. A computer data signal according to claim 14 wherein the program code for cryptographically hashing the combination comprises program code for passing the combination through a one-way function.

* * * * *